US007798689B2

(12) United States Patent
Kagiyama

(10) Patent No.: US 7,798,689 B2
(45) **Date of Patent: *Sep. 21, 2010**

(54) INFRARED LIGHT IRRADIATING LAMP FOR VEHICLE

(75) Inventor: Shinji Kagiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 11/890,701

(22) Filed: Aug. 7, 2007

(65) Prior Publication Data

US 2008/0037270 A1 Feb. 14, 2008

(30) Foreign Application Priority Data

Aug. 9, 2006 (JP) ............................ 2006-217482

(51) Int. Cl.

*F21V 11/00* (2006.01)
*F21V 17/02* (2006.01)
*F21V 5/00* (2006.01)
*B60Q 1/00* (2006.01)

(52) U.S. Cl. ....................... 362/538; 362/510; 362/539; 362/512; 362/520

(58) Field of Classification Search ................. 362/510, 362/539, 512, 520–522

See application file for complete search history.

(56) References Cited

U.S. PATENT DOCUMENTS 4,604,680 A * 8/1986 Levin et al. ................. 362/293
6,467,940 B2 * 10/2002 Eschler et al. .............. 362/510
6,896,396 B2 * 5/2005 Yagi ........................... 362/510
6,897,459 B2 * 5/2005 Albou .................... 250/504 R
6,976,772 B2 * 12/2005 Albou et al. ................ 362/510
2003/0076688 A1 * 4/2003 Kobayashi .................. 362/510
2003/0202358 A1 * 10/2003 Albou et al. ................ 362/510
2004/0042070 A1 * 3/2004 Yagi et al. .................... 359/350
2004/0136200 A1 * 7/2004 Bos et al. ..................... 362/512
2004/0228137 A1 * 11/2004 Mensales et al. ............ 362/507

(Continued)

FOREIGN PATENT DOCUMENTS

DE 102004058038 A1 7/2005

(Continued)

OTHER PUBLICATIONS

Patent Abstracts of Japan, Publication No. 2004-087281, Publication Date: Mar. 18, 2004, 2 pages.

(Continued)

*Primary Examiner*—Jacob Y Choi
*Assistant Examiner*—David J Makiya
(74) *Attorney, Agent, or Firm*—Osha Liang LLP

(57) ABSTRACT

An infrared light irradiating lamp for a vehicle includes a projection lens disposed on an optical axis extending in a longitudinal direction of the vehicle; a light source bulb disposed behind a rear side focal point of the projection lens that includes a filament for emitting a light; a reflector for reflecting the light emitted from the light source bulb in a forward direction close to the optical axis; and an infrared light transmitting filter disposed between the reflector and the projection lens. The infrared light transmitting filter includes an infrared light transmitting film and a diffusing portion for diffusing a light transmitted from the reflector. The infrared light transmitting filter is movable between a transmitting position in which the infrared light transmitting film intercepts light reflected by the reflector and a retreating position in which infrared light transmitting film does not intercept the reflected light.

9 Claims, 9 Drawing Sheets

U.S. PATENT DOCUMENTS

| | | | | |
|---|---|---|---|---|
| 2004/0240221 | A1* | 12/2004 | Choi | 362/510 |
| 2005/0237759 | A1* | 10/2005 | Natchoo | 362/512 |
| 2006/0002128 | A1* | 1/2006 | Suzuki et al. | 362/509 |
| 2006/0203503 | A1* | 9/2006 | Casenave | 362/539 |
| 2009/0052200 | A1* | 2/2009 | Tessnow et al. | 362/510 |

FOREIGN PATENT DOCUMENTS

| | | |
|---|---|---|
| DE | 60318581 T2 | 12/2008 |
| JP | 2004-71443 | 3/2004 |
| JP | 2004-87281 | 3/2004 |

OTHER PUBLICATIONS

Patent Abstracts of Japan, Publication No. 2004-071443, Publication Date: Mar. 4, 2004, 2 pages.

German Office Action for Application No. 10 2007 037 309.2-54, mailed on May 13, 2009 (9 pages).

* cited by examiner

INFRARED LIGHT IRRADIATING LAMP FOR VEHICLE

This application claims foreign priority from Japanese Patent Application No. 2006-217482 filed on Aug. 9, 2006, the entire contents of which are hereby incorporated by reference.

BACKGROUND OF INVENTION

1. Field of the Invention

The present invention relates to an infrared light irradiating lamp for a vehicle which can irradiate a light of a light source bulb having a filament as an infrared light by using a reflector, an infrared light transmitting filter and a projection lens.

2. Background Art

There is an infrared light irradiating lamp for a vehicle which is loaded onto a car and illuminates a forward part of a vehicle with an infrared light, and can process a photographed image to confirm an obstacle together with a CCD camera having a near-infrared sensitivity or less (for example, see Patent Document 1).

As shown in FIG. 13, an infrared light irradiating lamp 1 for a vehicle of this type has such a structure that a light source bulb 9 to be a visible light source and a reflector 11 taking an almost elliptical spherical shape are disposed in a lighting chamber 7 formed by a lamp body 3 and a front lens 5, and an infrared light transmitting filter 13 in which an infrared light transmitting film for reflecting a visible light component and transmitting an infrared light component is formed in a whole surface region of a glass plate is provided between the light source bulb 9 and the front lens 5 in order to close a whole front opening portion of the lighting chamber 7.

In general, the light source bulb 9 is attached in a so-called rear inserting structure in which it is inserted from a rear part of the reflector 11 along an optical axis Ax of a lamp emitting light and is constituted in such a manner that a whole light emitted from a light source toward the front lens 5 is irradiated on the infrared light transmitting film. A visible light component of the light of the light source which is reflected by the reflector 11 is cut when the light is transmitted through the infrared light transmitting film, and the light is mainly changed into a light having only an invisible infrared light component and is emitted and distributed forward from the front lens 5.

An infrared light irradiating region in the forward part of the vehicle is photographed by means of a CCD camera having a near-infrared sensitivity or less which is provided in the front part of the car and is processed by an image processing device, and is displayed on a monitor screen in a vehicle compartment. A driver can confirm a person, a lane mark and an obstacle in a distant place over the monitor screen for displaying a field of view in the forward part of the vehicle.

However, a conventional infrared light irradiating lamp for a vehicle is provided with an additional light source for an infrared light. For this reason, the number of components is increased and a man-hour for attaching the light source for an infrared light is also increased so that a cost is increased. Therefore, there has been proposed an infrared light irradiating lamp for a vehicle which can utilize an existing headlamp as the light source for an infrared light (for example, see Patent Document 2).

As shown in FIG. 14, the infrared light irradiating lamp for a vehicle comprises a halogen lamp 15 for emitting a light at least from a visible region to an infrared region, and a filter 17 for transmitting an infrared light in the lights emitted from the halogen lamp 15 and shielding a visible light. The halogen lamp 15 and the filter 17 are accommodated in one lamp unit and the filter 17 provided to be rotatable in an A direction around a pin 19 is rotated in the A direction so that the infrared light or a high beam is switched and emitted.

[Patent Document 1] JP-A-2004-87281 Publication

[Patent Document 2] JP-A-2004-71443 Publication

SUMMARY OF THE INVENTION

In a conventional infrared light irradiating lamp for a vehicle, a filter is provided rotatably around a pin. Consequently, it is possible to switch to the infrared light or the high beam and to emit an infrared light using a smaller number of components while utilizing an existing headlamp. Therefore, a light distribution pattern in the high beam and a light distribution pattern in an irradiation of the infrared light are identical to each other through a common reflector.

For this reason, when the light distribution pattern for the infrared light has a priority, a sufficient distant irradiation cannot be carried out with the high beam. Therefore, it is hard to maintain an excellent distant visibility. On the other hand, when the light distribution pattern for the high beam has a priority, the infrared light is converged and is not diffused in a transverse direction in the irradiation of the infrared light so that the irradiation of the infrared light in a direction of a side such as a pavement or a shoulder of a road is insufficient. In order to switch and emit the infrared light and the high beam, accordingly, mutual light distribution patterns are to be compromised. For this reason, a usability is not always excellent.

One or more embodiments of the present invention provide an infrared light irradiating lamp for a vehicle of a visible light and infrared light switching type which can obtain different light distributions for high beam and an infrared light irradiation, thereby achieving demands for high beam and infrared light irradiation, which can be contrary to each other, at the same time.

Embodiments of the invention involve an infrared light irradiating lamp for a vehicle comprising: a projection lens disposed on an optical axis extending in a longitudinal direction of the vehicle; a light source bulb disposed on a rear side behind focal point of the projection lens, the light source bulb comprising a filament for emitting light; a reflector for reflecting the light emitted from the light source bulb in a forward direction close to the optical axis; and an infrared light transmitting filter provided between the reflector and the projection lens, wherein the infrared light transmitting filter is movable between a transmitting position in which an infrared light transmitting film intercepts light reflected by the reflector and a retreating position in which the infrared light transmitting film does not intercept the reflected light, and comprises a diffusing portion for diffusing a light transmitted from the reflector.

In an infrared light irradiating lamp for a vehicle in accordance with one or more embodiments of the present invention, the light transmitted through the diffusing portion in the lights transmitted from the reflector through the infrared light transmitting filter in the irradiation of the infrared light is diffused in a horizontal direction, and a different light distribution from a high beam is obtained.

Even if the light distribution pattern of the reflector is set in such a manner that a distant place is irradiated in the high beam and an excellent distant visibility can be maintained, therefore, it is possible to complement the irradiation of the infrared light in a direction of a side such as a pavement or a shoulder of a road by diffusing the infrared light in a transverse direction through the diffusing portion in the irradiation of the infrared light.

In an infrared light irradiating lamp for a vehicle in accordance with one or more embodiments of the present invention, the diffusing portion is formed on a front surface of the infrared light transmitting filter.

In an infrared light irradiating lamp for a vehicle in accordance with one or more embodiments of the present invention, it is possible to prevent a transmittance from being reduced by the reflection of the infrared light transmitting filter.

More specifically, when the light reflected by the reflector passes through the infrared light transmitting filter, an incident angle of a light is increased, a reflectance is increased at a certain angle and a transmittance is reduced if the diffusing portion taking a concavo-convex shape is formed on an incident plane of the infrared light transmitting filter. In an infrared light irradiating lamp for a vehicle in accordance with one or more embodiments of the present invention, the diffusing portion taking the concavo-convex shape is formed on an emitting plane. Consequently, the incident angle of the light can be prevented from being increased, an increase in the reflectance can be suppressed and the transmittance (a filter efficiency) can be increased.

In the infrared light irradiating lamp for a vehicle which has the structure, moreover, it is desirable that the infrared light transmitting filter should be disposed behind a rear side focal point of the projection lens, and a groove bottom portion of the diffusing portion should take a concave shape in the vicinity of the optical axis.

In an infrared light irradiating lamp for a vehicle in accordance with one or more embodiments of the present invention, the infrared light transmitting filter is provided behind the rear side focal point of the projection lens. Therefore, the light reflected by the reflector passes through the diffusing portion taking the concave shape so that the reflected light is once collected between the infrared light transmitting filter and the projection lens. Then, the reflected light is changed into a diffused light and the diffused light is irradiated toward the projection lens. Consequently, a larger diffused light can be obtained by the passage through the projection lens.

In an infrared light irradiating lamp for a vehicle in accordance with one or more embodiments of the present invention, furthermore, it is desirable that the infrared light transmitting filter should be disposed in front of a rear side focal point of the projection lens and a ridge line of the diffusing portion should take a convex shape in the vicinity of the optical axis.

In an infrared light irradiating lamp for a vehicle in accordance with one or more embodiments of the present invention, the infrared light transmitting filter is provided in front of the rear side focal point of the projection lens. Therefore, the light reflected by the reflector passes through the diffusing portion taking the convex shape so that the light is diffused between the infrared light transmitting filter and the projection lens and is irradiated toward the projection lens. Consequently, a larger diffused light can be obtained by the passage through the projection lens.

In an infrared light irradiating lamp for a vehicle in accordance with one or more embodiments of the present invention, the infrared light transmitting filter is provided with a light distribution regulating portion for converging the light transmitted from the reflector separately from the diffusing portion.

In an infrared light irradiating lamp for a vehicle in accordance with one or more embodiments of the present invention, in the case in which a diffusion is demanded to some degree in the high beam, for example, a regulation capable of carrying out a diffusion and emission is previously performed by the reflector. In this case, if the infrared light transmitting filter having the diffusing portion formed therein is used as it is, a diffusion within an unnecessary range is generated by the infrared light transmitting filter having the diffusing portion formed therein. However, a convergence is carried out by the light distribution regulating portion so that an unnecessary diffusion can be corrected.

In an infrared light irradiating lamp for a vehicle in accordance with one or more embodiments of the invention, the light transmitted through the diffusing portion in the lights transmitted from the reflector through the infrared light transmitting filter in the irradiation of the infrared light is diffused in a horizontal direction, and a different light distribution from a high beam is obtained.

Even if the light distribution pattern of the reflector is set in such a manner that a distant place is irradiated in the high beam and an excellent distant visibility can be maintained, therefore, it is possible to complement the irradiation of the infrared light in a direction of a side such as a pavement or a shoulder of a road by diffusing the infrared light in a transverse direction through the diffusing portion in the irradiation of the infrared light. Thus, it is possible to simultaneously achieve the demands for the high beam and the infrared light irradiation which are contrary to each other.

Other aspects and advantages of the invention will be apparent from the following description and the appended claims.

DETAILED DESCRIPTION OF THE EXEMPLARY EMBODIMENTS

Embodiments of an infrared light irradiating lamp for a vehicle according to the invention will be described below in detail with reference to the accompanying drawings. Like items in the figures are shown with the same reference numbers. In this application, a longitudinal direction of the vehicle is the direction in which a vehicle incorporating the infrared light irradiating lamp would travel, and front and forward denote a forward direction of travel of the vehicle, while behind and rear denote a backward direction of travel of the vehicle. A vertical direction is a direction perpendicular to a ground plane of the vehicle. A longitudinal direction of a filament is a direction in which the filament has the greatest length.

Figure 1:
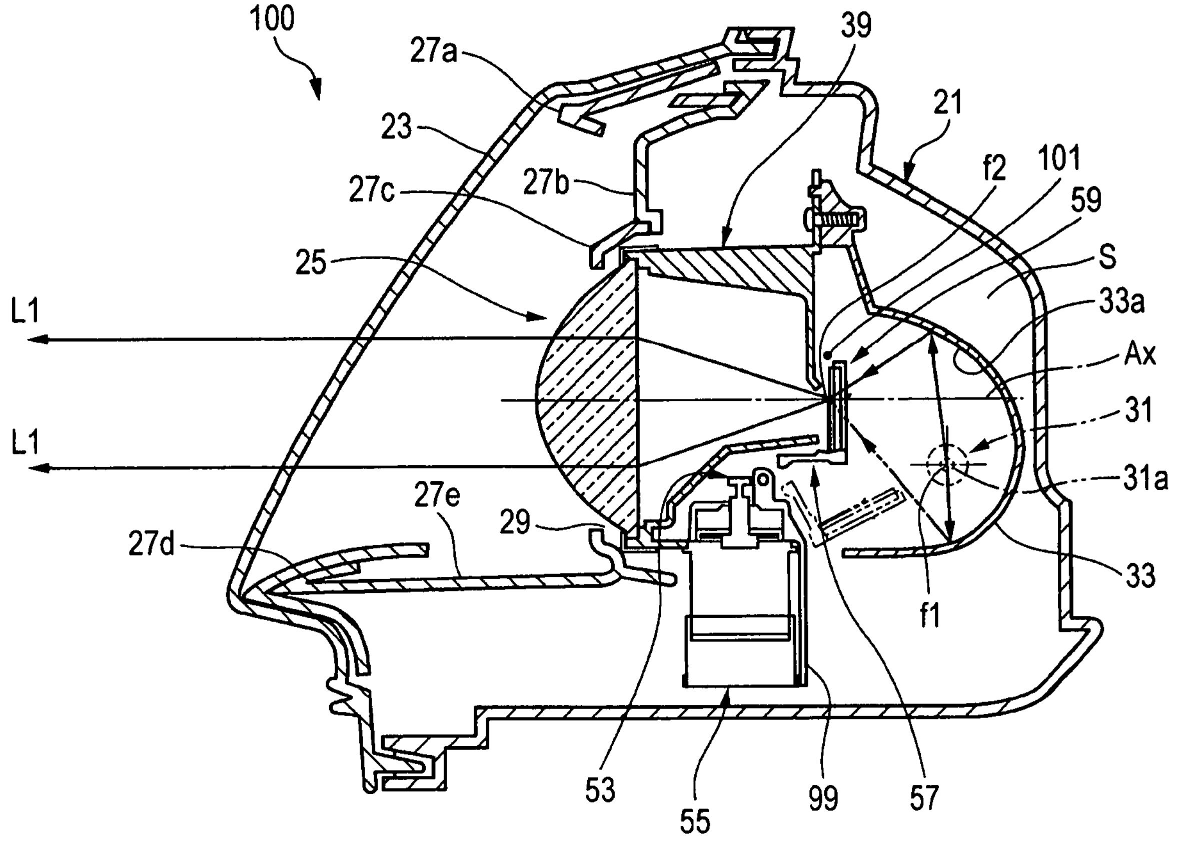
FIG. 1 is a vertical sectional view showing an infrared light irradiating lamp for a vehicle according to a first embodiment of the invention.
Figure 2:
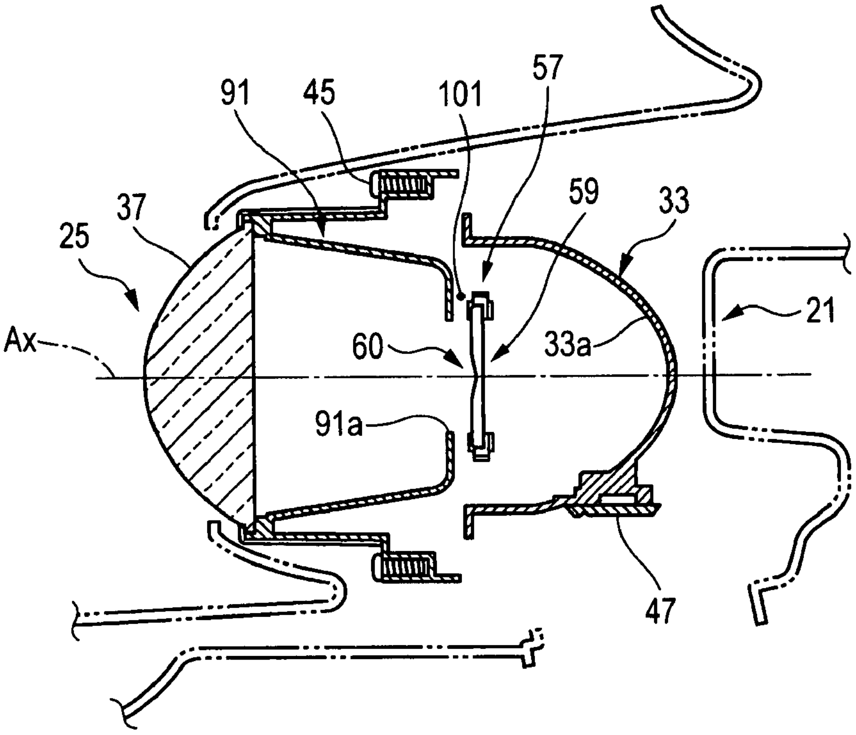
FIG. 2 is a horizontal sectional view showing a light source unit illustrated in FIG. 1.
Figure 3:
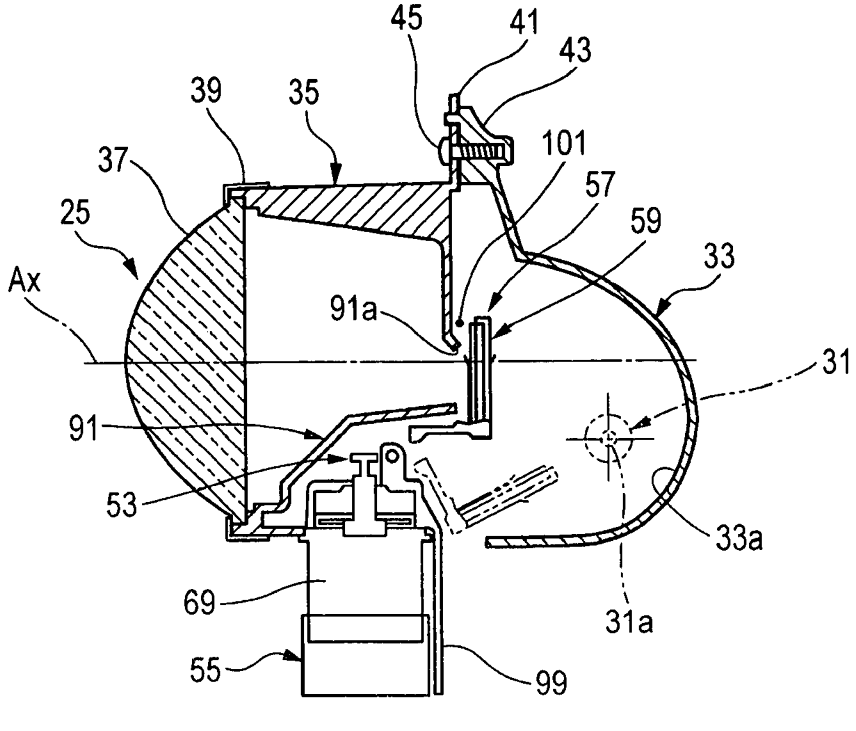
FIG. 3 is a longitudinal sectional view showing the light source unit illustrated in FIG. 1.
Figure 4:
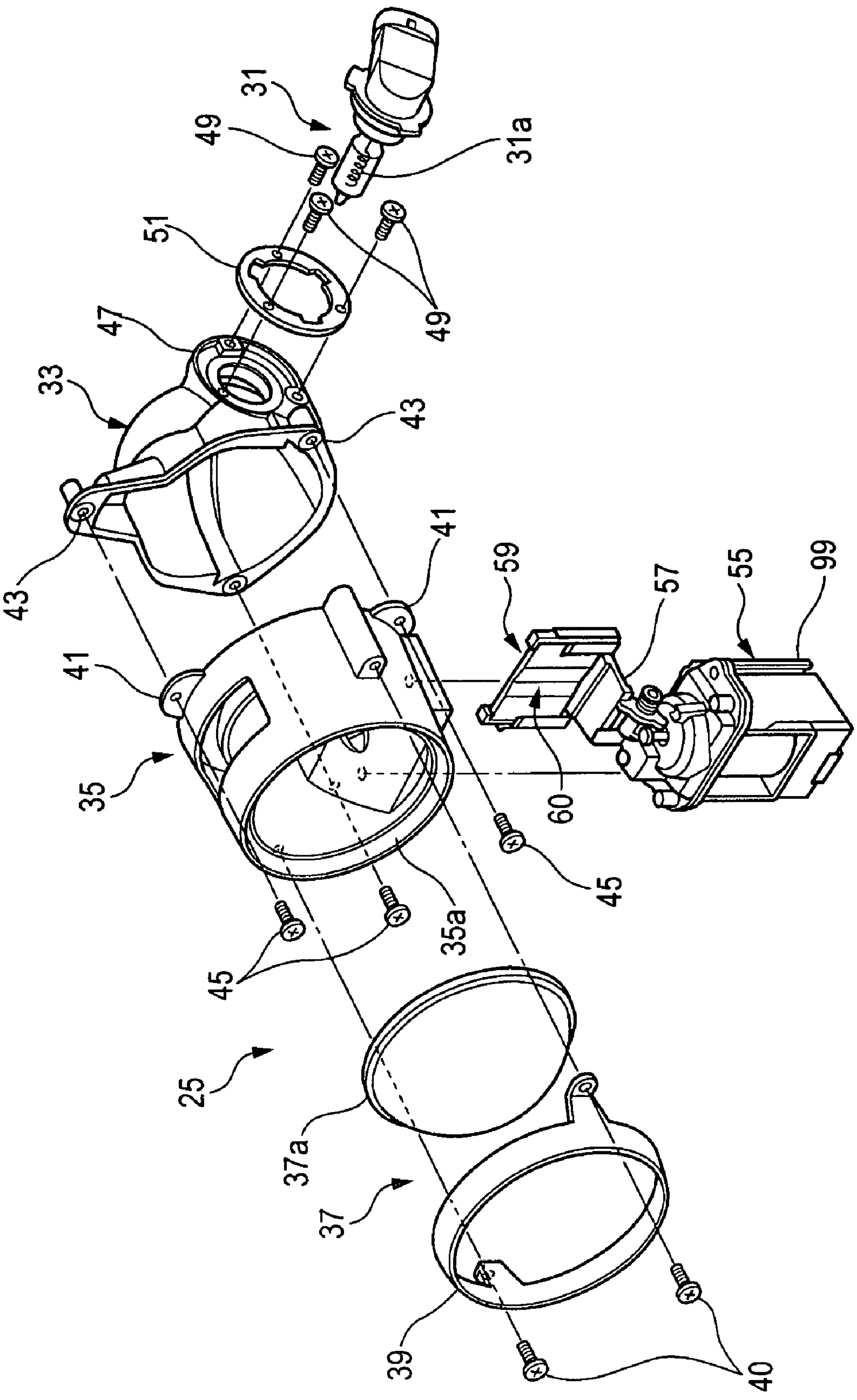
FIG. 4 is an exploded perspective view showing the light source unit illustrated in FIG. 1.

FIG. 1 is a vertical sectional view showing an infrared light irradiating lamp for a vehicle according to a first embodiment of the invention, FIGS. 2 and 3 are horizontal and longitudinal sectional views of a light source unit illustrated in FIG. 1, and FIG. 4 is an exploded perspective view showing the light source unit illustrated in FIG. 1.

An infrared light irradiating lamp 100 for a vehicle according to the embodiment is used in a night forward visual field detecting system and is provided in a front portion of a vehicle to irradiate an infrared light onto a forward part of the vehicle, for example. The night forward visual field detecting system is constituted by the infrared light irradiating lamp 100 for a vehicle shown in FIG. 1, an infrared light compatible CCD camera (not shown) which is provided in an upper part in a vehicle compartment and serves to photograph a view of field in the forward part of the vehicle, for example, an image processing analyzing apparatus (not shown) for analyzing an image photographed by the CCD camera, and a head up display (HUD) (not shown) for displaying data analyzed by the image processing analyzing apparatus.

Images of invisible distant pedestrians, obstacles, or lane marks which are photographed by the CCD camera are sent to the image processing analyzing apparatus. By carrying out an edge processing or a pattern recognition from the image, however, it is possible to easily recognize the pedestrians, the obstacles, and the lane marks.

The images of the pedestrians, the obstacles, and the lane marks can be given to a driver through the head up display (HUD), and can decide the features of the objects on a road (the pedestrians, the obstacles, and the lane marks) through a shape recognition, thereby giving a notice to the driver in a voice.

As shown in FIG. 1, the infrared light irradiating lamp 100 for a vehicle is constituted by a lamp body 21 formed of a synthetic resin which has a front side opened and takes a shape of a vessel, a transparent front cover 23 assembled into the front opening portion of the lamp body 21 and serving to partition and form a lighting chamber S in cooperation with the lamp body 21, and a projection type light source unit (light source unit) 25 accommodated in the lighting chamber S and supported to be regulated tiltably in vertical and transverse directions by means of an aiming mechanism which is not shown.

Extensions 27*a*, 27*b*, 27*c* and 27*e* constituted by a division into a plurality of portions are provided in the lamp body 21. The extensions 27*a*, 27*b*, 27*c* and 27*e* form an opening 29 for causing the light source unit 25 to appear and cover a portion of the light source unit 25 which does not need to be exposed.

As shown in FIGS. 2 and 3, the light source unit 25 has a reflector 33 formed by aluminum die casting into which a light source bulb 31 is inserted and attached, and a convex lens (a projection lens) 37 integrated with a forward part of the reflector 33 through a cylindrical lens holder 35 and disposed on an optical axis Ax extended in a longitudinal direction of the vehicle.

The reflector 33 has a reflector reflecting plane 33*a* taking an almost elliptical spherical shape and serving to reflect a light emitted from the light source bulb 31 close to the optical axis Ax, and has a first focal point f1 and a second focal point f2 between the reflector 33 and the projection lens 37.

The light source unit 25 has such a structure that a filament 31*a* of the light source bulb 31 is positioned on the first focal point f1 of the reflector 33 and the second focal point f2 of the reflector 33 is positioned in the vicinity of a rear focal point of the convex lens 37 so that a light of the light source which is reflected by an effective reflecting plane subjected to an aluminum evaporation treatment in the reflector 33 is changed into an almost parallel light L1 through the convex lens 37 and is thus projected and distributed.

More specifically, a light distribution pattern created by the light source unit 25 is the same as that of a headlamp of a car for forming a main beam.

As shown in FIG. 4, the lens holder 35 is formed by the same aluminum die casting as the reflector 33, and a front edge portion thereof is circumferentially provided with a lens engaging portion 35*a* taking a shape of a peripheral groove with which a peripheral flange portion 37*a* of the convex lens 37 can be engaged.

A lens holding frame 39 formed of a metal and taking a shape of a circular ring is fixed to the front edge portion of the lens holder 35 with a screw 40, and the peripheral flange portion 37*a* of the convex lens 37 is fixed and held in an engaging state with the lens engaging portion 35*a*.

A coupling flange portion 41 of the lens holder 35 and a coupling flange portion 43 of the reflector 33 are bonded to each other by bonding means such as a screw 45.

The light source bulb 31 of the light source unit 25 is inserted and fixed into an attaching opening portion 47 of the reflector 33 from the side of the optical axis Ax as shown in FIG. 4. More specifically, while the conventional infrared light irradiating lamp for a vehicle shown in FIG. 13 has a rear inserting structure, the infrared light irradiating lamp 100 for a vehicle according to the embodiment has a transverse inserting structure.

In the light source unit 25, consequently, the longitudinal direction of the filament 31*a* is almost orthogonal to the direction of the optical axis Ax and the filament 31*a* is disposed to be positioned on the first focal point f1. A removing ring 51 is fixed to the attaching opening portion 47 through a screw 49, and the removing ring 51 removably inserts and attaches the light source bulb 31 in a drip proof structure.

In the infrared light irradiating lamp 100 for a vehicle, as shown in FIG. 3, the light source bulb 31 is inserted and fixed into the reflector 33 from the side of the optical axis Ax in a position placed apart from the optical axis Ax in a vertical direction (a position placed apart in a downward direction in the embodiment).

Figure 13:
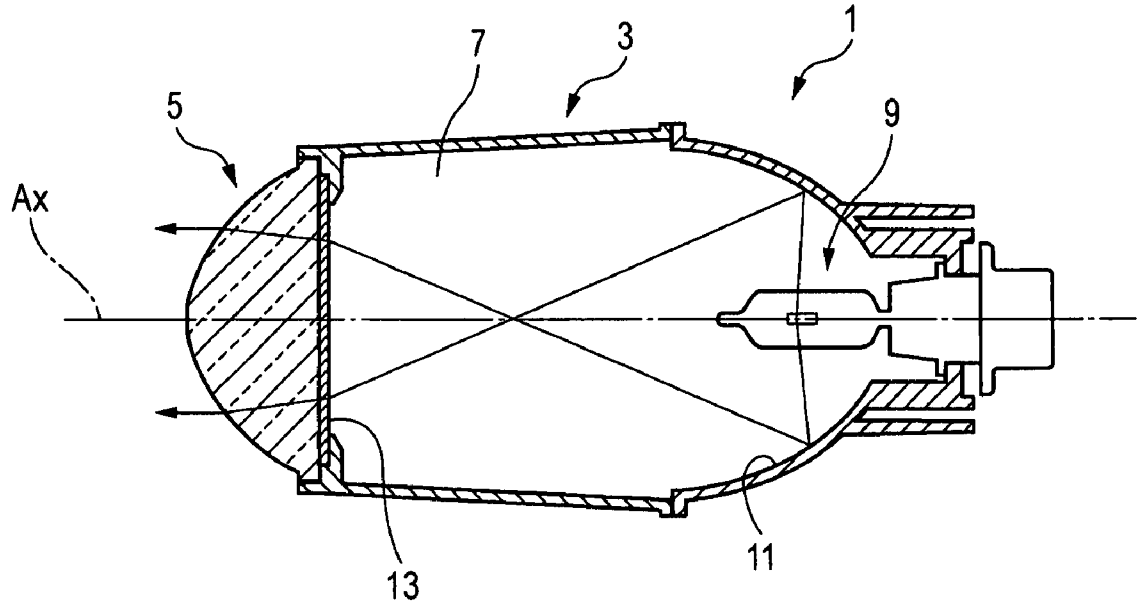
FIG. 13 is a vertical sectional view showing a conventional infrared light irradiating lamp for a vehicle.
Figure 14:
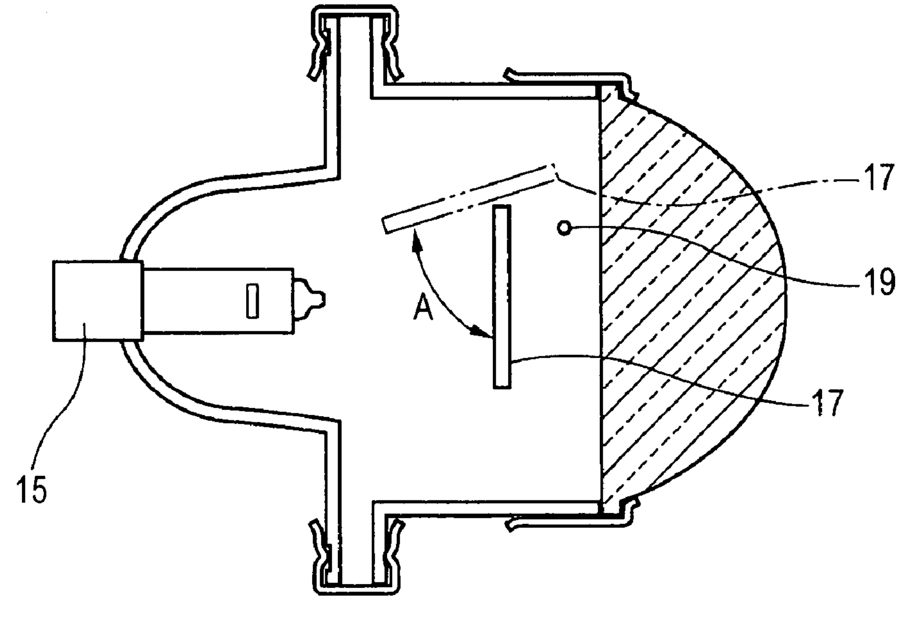
FIG. 14 is a vertical sectional view showing a conventional infrared light irradiating lamp for a vehicle which comprises a movable infrared light transmitting filter.

For example, in the conventional structure in which the light source bulb 9 is disposed on the optical axis as shown in FIG. 13, if the reflector reflecting plane functions in a state in which a vertical division into two parts is carried out and a shade is provided on a lower side, a light reflected by the reflecting plane in a lower half part is cut and wasted. Accordingly, only an upper reflecting plane having a small area divided into two parts is effective and a light utilization efficiency is reduced.

On the other hand, when the light source bulb 31 is inserted apart into the lower side of the optical axis Ax as in the embodiment, it is possible to maintain the larger reflector reflecting plane 33*a* which is continuous from a lower side of the optical axis Ax to an upper side thereof as compared with the case in which the reflector reflecting plane is vertically divided into two parts and is thus used. Consequently, it is possible to prevent the light reflected by the reflecting plane on the lower side from being wasted when the shade or a member such as a filter driving unit 55 which will be described below is present on the lower side of the optical axis Ax, for example. Thus, it is possible to increase the utilization efficiency of the light. In other words, it is possible to maintain an effective continuous reflecting plane to be large.

Figure 5:
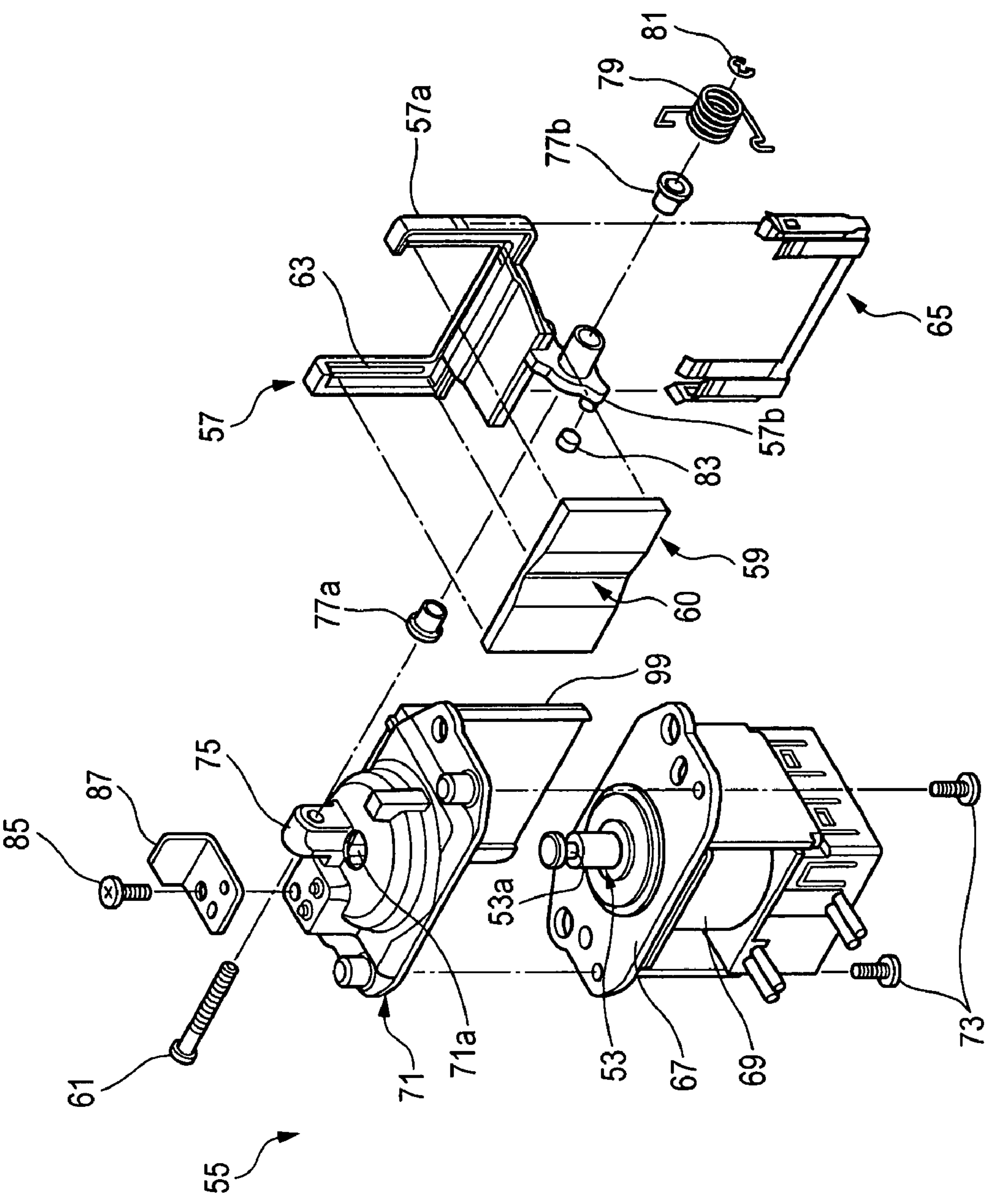
FIG. 5 is an exploded perspective view showing a filter driving unit illustrated in FIG. 4.

FIG. 5 is an exploded perspective view showing the filter driving unit illustrated in FIG. 4.

The filter driving unit 55 having a movable shaft 53 to be driven in an axial direction which is extended vertically and a bracket 57 are provided between the convex lens 37 and the light source bulb 31.

The bracket 57 is formed in such a manner that an infrared light transmitting filter 59 is held on a tip portion 57*a*, the movable shaft 53 is linked to a base end 57*b* on an opposite side of the tip portion 57*a* with a rotating shaft 61 interposed therebetween and a distance from the rotating shaft 57 to the base end 57*b* is shorter than a distance from the rotating shaft 61 to the tip portion 57*a*.

Furthermore, the bracket 57 includes a frame-shaped holder portion 63 for accommodating the infrared light transmitting filter 59, and a clip 65 for interposing the infrared light transmitting filter 59 engaged and accommodated in the holder portion 63 between a surface and a back face so as not to slip from the holder portion 63.

When the infrared light transmitting filter 59 is put in the holder portion 63 and the clip 65 is engaged with the holder portion 63, therefore, the infrared light transmitting filter 59 is held in the clip 65 simultaneously with the engagement of the clip 65 with the holder portion 63. With a simple structure and an easy attaching work, consequently, the infrared light transmitting filter 59 can be attached to the bracket 57 reliably and strongly.

Figure 6:
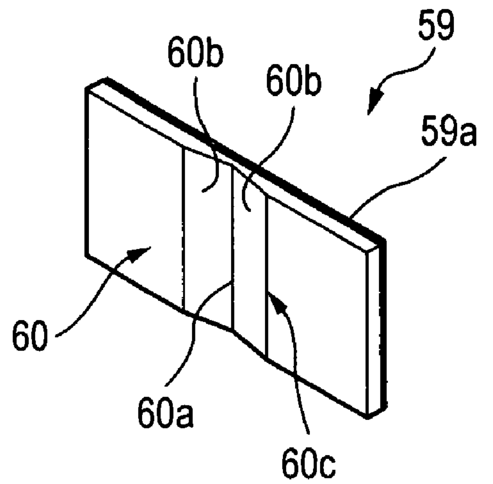
FIG. 6 is an enlarged perspective view showing an infrared light transmitting filter illustrated in FIG. 5.

The infrared light transmitting filter 59 is obtained by depositing, on a glass plate, an infrared light transmitting film 59*a* for reflecting a visible light component and transmitting an infrared light component (see FIG. 6). In the light source unit 25 according to the embodiment, by disposing the infrared light transmitting film 59*a* in the vicinity of the second focal point f2 of the reflector 33 to be the proximity of a light collecting portion, it is possible to reduce a range in which the infrared light transmitting film 59*a* is to be formed.

Figure 7:
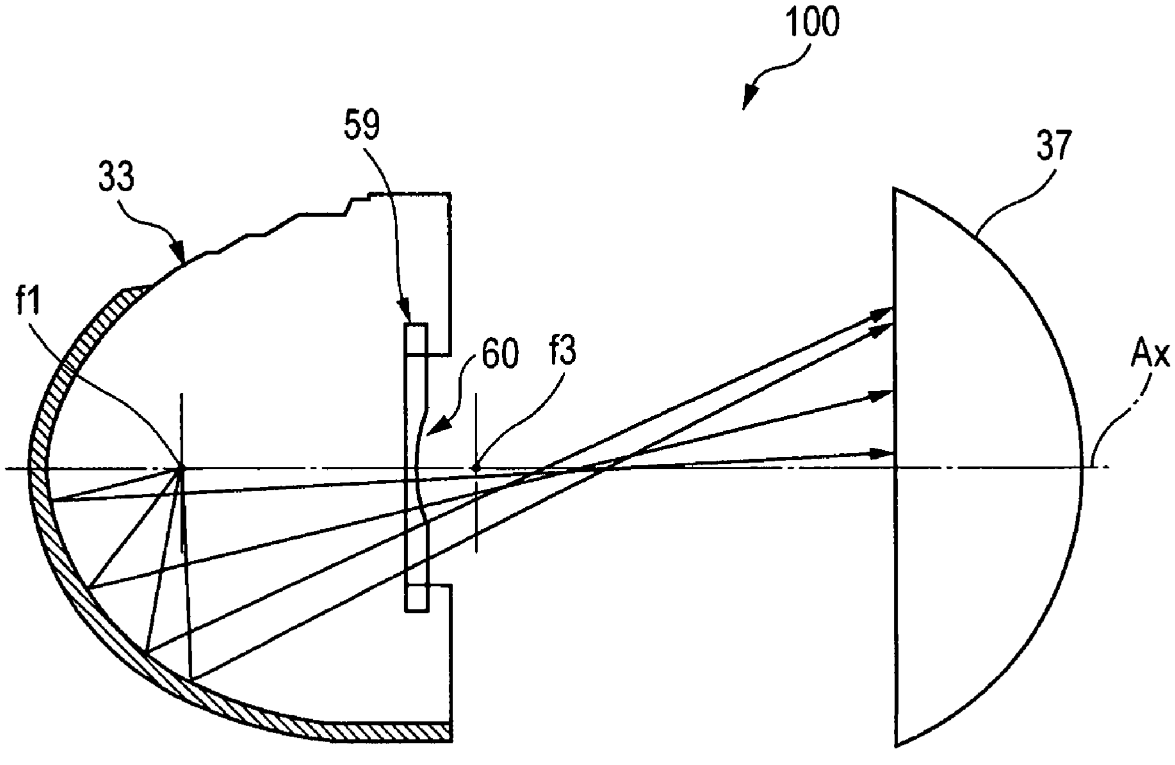
FIG. 7 is an explanatory view showing the function of the infrared light transmitting filter having a concave-shaped diffusing portion formed thereon as illustrated in FIG. 6, FIG. 8(*a*) is a view for explaining an operation in an excitation state and FIG. 8(*b*) is a view for explaining an operation in a non-excitation state of a magnet coil of a filter driving unit illustrated in FIG. 4.

FIG. 6 is an enlarged perspective view showing the infrared light transmitting filter illustrated in FIG. 5, and FIG. 7 is an explanatory view showing the function of the infrared light transmitting filter having a concave-shaped diffusing portion formed thereon as illustrated in FIG. 6.

The infrared light transmitting filter 59 is disposed behind a rear side focal point f3 of the convex lens 37, and a groove bottom portion 60*a* of a diffusing portion 60 is formed to be concave-shaped in the vicinity of the optical axis Ax. The second focal point f2 of the reflector 33 and the rear side focal point f3 of the convex lens 37 are disposed to be almost coincident with each other.

In the case in which the infrared light transmitting filter 59 is provided behind the rear side focal point f3 of the convex lens 37 (a close side to the reflector 33), the light reflected by the reflector 33 passes through the diffusing portion 60 taking the concave shape as shown in FIG. 7 so that the reflected light is once converged between the infrared light transmitting filter 59 and the convex lens 37 and is then changed into a diffused light to be irradiated toward the convex lens 37.

By the passage through the convex lens 37, consequently, a larger diffused light can be obtained.

In the infrared light transmitting filter 59 according to the embodiment, the diffusing portion 60 taking the concave shape is formed by a V groove 60*c* in which both internal wall surfaces 60*b* and 60*b* are inclined downward toward the straight groove bottom portion 60*a*. For a filter material of the infrared light transmitting filter 59, a glass is the best at the request of a heat resistance and a light transmittance. By setting the diffusing portion 60 to be the V groove 60*c*, therefore, it is possible to easily form the infrared light transmitting filter 59 by a glass material through cutting, polishing or molding. Moreover, the infrared light transmitting filter 59 may be formed by a resin molded component.

The movable shaft 53 is absorbed and driven by a magnetic force in a downward direction of FIG. 5 by an excitation of a magnet coil 69 accommodated in a yoke 67.

A base member 71 for inserting the movable shaft 53 is fixed to an upper part of the yoke 67 with a screw 73. A through hole 71*a* for protruding the movable shaft 53 therethrough is provided on the base member 71. A bearing portion 75 for causing the rotating shaft 61 to penetrate therethrough and supporting the rotating shaft 61 is erected in the vicinity of the through hole 71*a*.

A collar 77*a*, the base end 57*b*, a collar 77*b*, an outside spring 79 and an E ring 81 are sequentially provided on the tip of the rotating shaft 61 penetrating through the bearing portion 75. Consequently, the bracket 57 is supported to be rockable around the rotating shaft 61.

Figure 8:
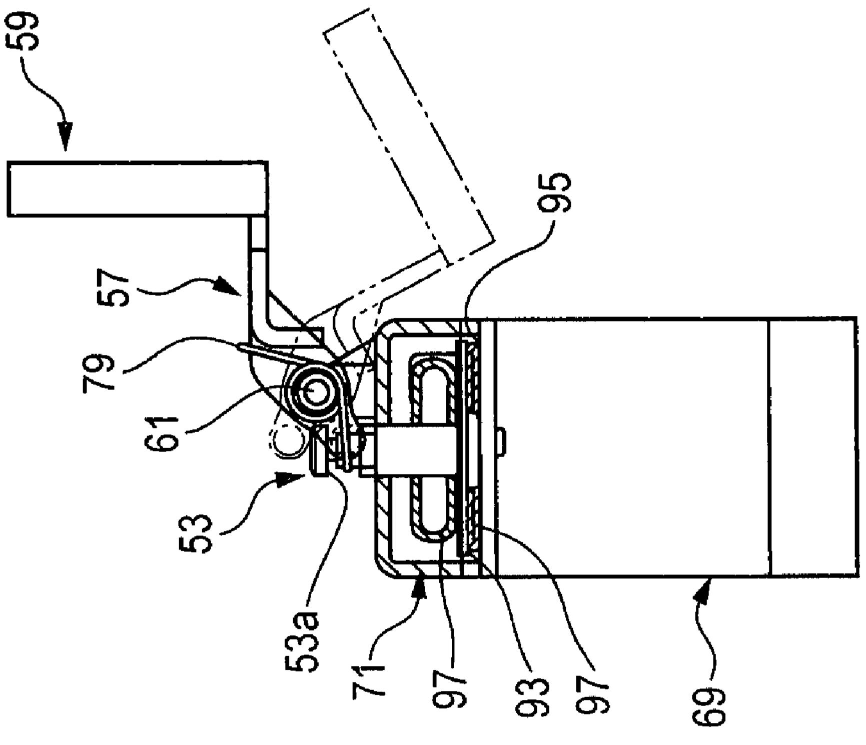
Figure 8:
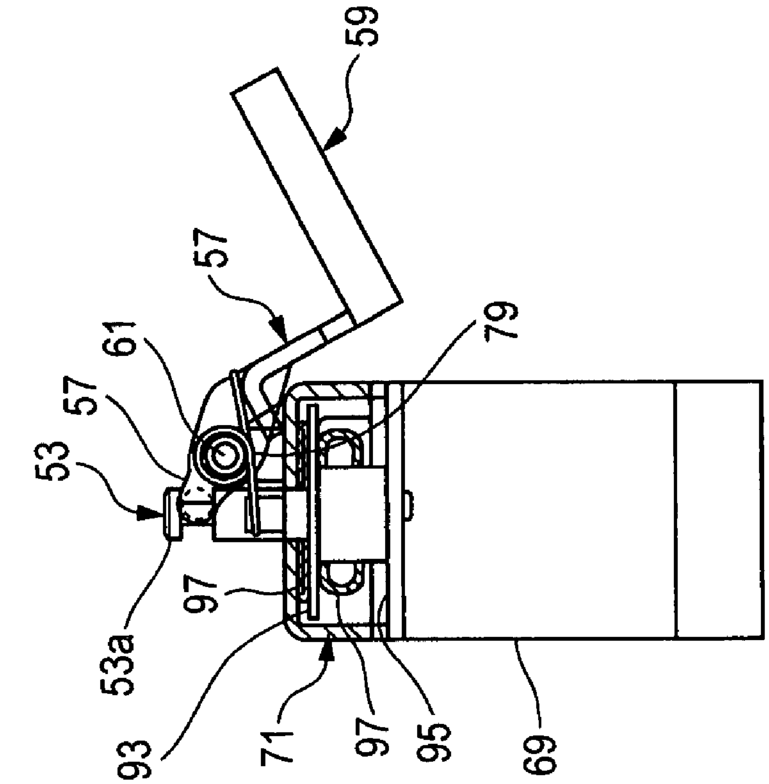

FIG. 8(*a*) is an explanatory view showing an operation in a magnet coil excitation state and FIG. 8(*b*) is an explanatory view showing an operation a non-excitation state in the filter driving unit illustrated in FIG. 4.

A cam bearing 83 is attached to the base end 57*b* of the bracket 57 and is slidably coupled (linked) to a step portion 53*a* of the movable shaft 53. The outside spring 79 energizes the bracket 57 in a clockwise direction of FIG. 8. When the magnet coil is OFF, that is, the magnet coil 69 is not excited, accordingly, the bracket 57 is rotated in a clockwise direction as shown in FIG. 8(*b*). Consequently, the base end 57*b* pushes up the step portion 53*a* so that the movable shaft 53 is disposed in an upward protruding position.

On the other hand, when the magnet coil is ON, that is, the magnet coil 69 is excited, the movable shaft 53 is moved downward by a magnetic force of the magnet coil 69 so that the cam bearing 83 is pushed downward by the step portion 53*a*. Consequently, the bracket 57 is rotated in a counterclockwise direction against the energizing force of the outside spring 79 as shown in FIG. 8(*a*). The bracket 57 rotated in the counterclockwise direction abuts on a spring plate 87 fixed onto an upper surface of the base member 71 with a screw 85 and is thus stopped.

The infrared light transmitting filter 59 held in the bracket 57 can be displaced between a transmitting position in which a light reflected by the reflector 33 is intercepted and a retreating position in which the reflected light is not intercepted between the light source bulb 31 and the second focal point f2 by a vertical operation of the movable shaft 53.

If the bracket 57 is disposed in the position in which the light reflected by the reflector 33 is intercepted, the light emitted from the light source bulb 31 is transmitted through the infrared light transmitting filter 59 and can be used as an infrared light irradiating lamp. On the other hand, if the bracket 57 is disposed in the position in which the light reflected by the reflector 33 is not intercepted, the light emitted from the light source bulb 31 is directly irradiated as a visible light and can be used as a normal headlight.

In other words, according to the infrared light irradiating lamp 100 for a vehicle in accordance with the embodiment, it is possible to cause one lamp to function as two different lamps, that is, an infrared light irradiating lamp and a normal headlight.

In the infrared light irradiating lamp 100 for a vehicle of a visible light and infrared light switching type which can selectively irradiate a high beam and an infrared light, thus, the light transmitted through the diffusing portion 60 in the lights transmitted through the infrared light transmitting filter 59 and reflected by the reflector 33 in the irradiation of the infrared light is diffused in the horizontal direction so that a different light distribution from the high beam is obtained.

Even if the light distribution pattern of the reflector 33 is set in such a manner that a distant place is irradiated in the high beam and an excellent distant visibility can be maintained, consequently, it is possible to complement the irradiation of the infrared light in a direction of a side such as a pavement or a shoulder of a road by diffusing the infrared light in the transverse direction through the diffusing portion 60 in the irradiation of the infrared light.

Furthermore, the light source unit 25 according to the embodiment includes a shade 91 provided with an opening portion 91*a* for causing a part of the light reflected by the reflector 33 to pass therethrough as shown in FIGS. 2 and 3.

The infrared light transmitting filter 59 is displaced in order to intercept the reflected light passing through the opening portion 91*a* between the shade 91 and the light source bulb 31.

More specifically, the infrared light transmitting filter 59 is displaced on the light source bulb 31 side of the shade 91. Therefore, the infrared light transmitting filter 59 and the vicinal members are covered with the shade 91, and the external appearances of the infrared light transmitting filter 59, the filter driving unit 55 and the bracket 57 cannot be seen from the outside of the lamp (the outside of the convex lens 37). Consequently, the appearance can be enhanced.

As shown in FIGS. 8(*a*) and 8(*b*), the filter driving unit 55 has a plate 93 fixed coaxially with the movable shaft 53 and absorbed by a magnetic force through an excitation of the magnet coil 69, and an abutting surface 95 of the yoke 67 on which the plate 93 pulled by the magnetic force abuts.

A hollow rubber washer 97 is provided coaxially with the movable shaft 53 between the plate 93 and the abutting surface 95. Moreover, the hollow rubber washer 97 is also provided between the base member 71 and the plate 93 coaxially with the movable shaft 53.

According to the infrared light irradiating lamp 100 for a vehicle, the infrared light transmitting filter 59 is provided to be displaceable between the transmitting position in which the light reflected by the reflector 33 is intercepted and the retreating position in which the reflected light is not intercepted, and furthermore, the infrared light transmitting filter 59 is provided with the diffusing portion 60 for diffusing the light transmitted from the reflector 33.

In the infrared light irradiating lamp 100 for a vehicle of the visible light and infrared light switching type which can selectively irradiate the high beam and the infrared light, therefore, it is possible to obtain different light distribution patterns from each other in the high beam and the infrared light irradiation. Even if the light distribution pattern of the reflector 33 is set in such a manner that a distant place is irradiated in the high beam and an excellent distant visibility can be maintained, consequently, it is possible to complement the irradiation of the infrared light in a direction of a side such as a pavement or a shoulder of a road by diffusing the infrared light in a transverse direction through the diffusing portion 60 in the irradiation of the infrared light. As a result, it is possible to simultaneously achieve the requests of the high beam and the infrared light irradiation which are contrary to each other.

Next, description will be given to an infrared light irradiating lamp for a vehicle according to a second embodiment of the invention.

Figure 9:
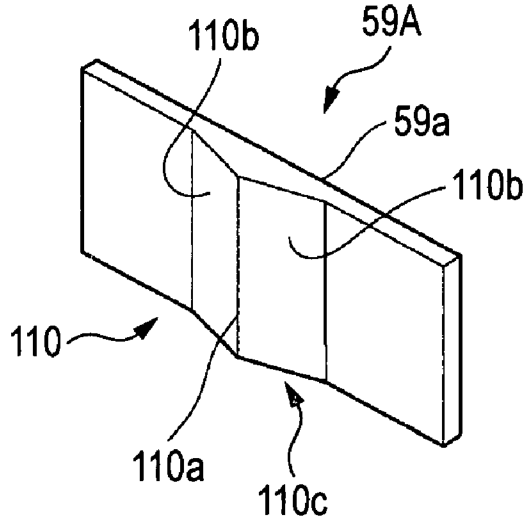
FIG. 9 is an enlarged perspective view showing an infrared light transmitting filter according to a second embodiment of the invention.
Figure 10:
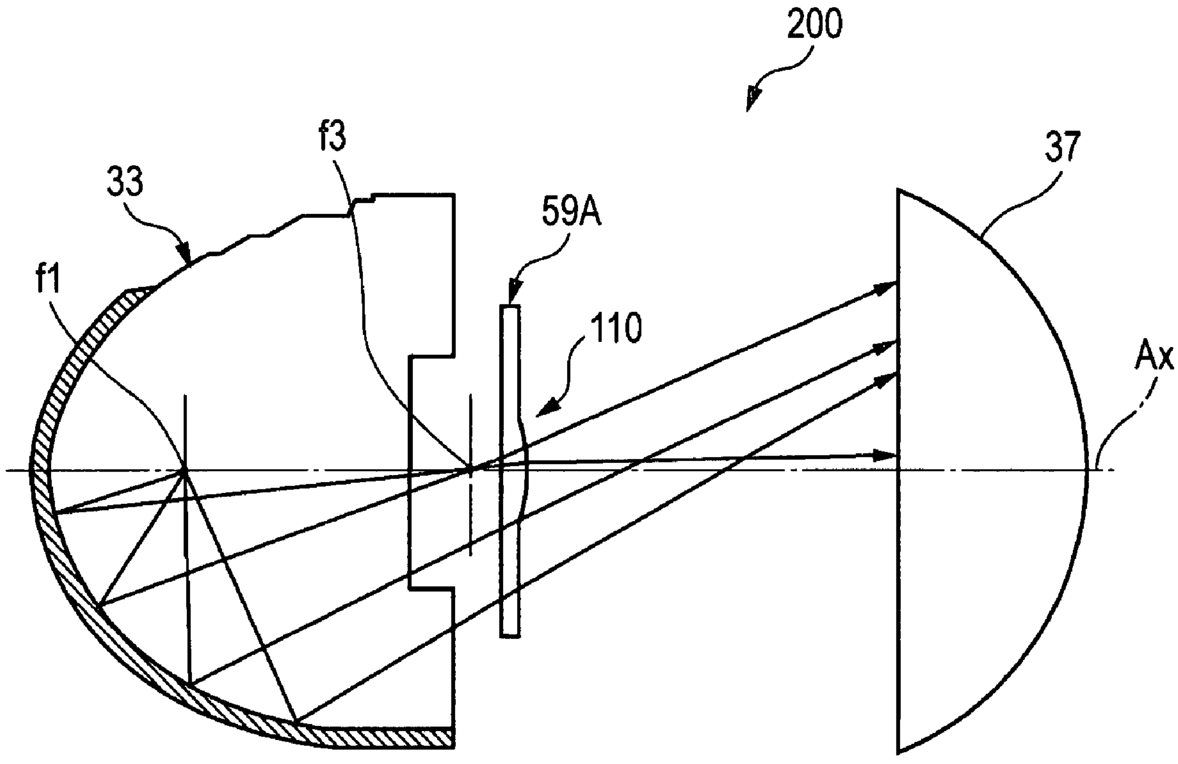
FIG. 10 is an explanatory view showing the function of the infrared light transmitting filter in which a diffusing portion taking a convex shape is formed.

FIG. 9 is an enlarged perspective view showing an infrared light transmitting filter according to the second embodiment of the invention, and FIG. 10 is an explanatory view showing the function of the infrared light transmitting filter in which a diffusing portion taking a convex shape is formed. Since an infrared light irradiating lamp 200 for a vehicle according to the second embodiment has almost the same structure as that of the infrared light irradiating lamp 100 for a vehicle according to the first embodiment except for a structure of an infrared light transmitting filter 59A, common components have the same reference numerals and detailed description will be omitted.

In the infrared light irradiating lamp 200 for a vehicle according to the embodiment, the infrared light transmitting filter 59A is disposed in front of a rear side focal point f3 of a convex lens 37 and a ridge line 110*a* of a diffusing portion 110 takes a convex shape in the vicinity of an optical axis Ax.

In the infrared light transmitting filter 59A according to the embodiment, the diffusing portion 110 taking the convex shape is formed as a V-shaped projection 110*c* by wall surfaces 110*b* and 110*b* to have downgrades which are symmetrical about the straight ridge line 110*a*. For a filter material of the infrared light transmitting filter 59A, a glass is the best at the request of a heat resistance and a light transmittance. By setting the diffusing portion 110 to be the V-shaped projection 110*c*, therefore, it is possible to easily form the diffusing portion 110 by a glass material through cutting, polishing or molding.

According to the infrared light irradiating lamp 200 for a vehicle, in the case in which the infrared light transmitting filter 59A is provided in front of the rear side focal point f3 of the convex lens 37 (a close side to the convex lens 37), a light reflected by a reflector 33 passes through the V-shaped diffusing portion 110 so that the light is further diffused between the infrared light transmitting filter 59A and the convex lens 37 and is irradiated toward the convex lens 37 as shown in FIG. 10. Consequently, a larger diffused light can be obtained by the passage through the convex lens 37.

Next, description will be given to an infrared light irradiating lamp for a vehicle according to a third embodiment of the invention.

Figure 11:
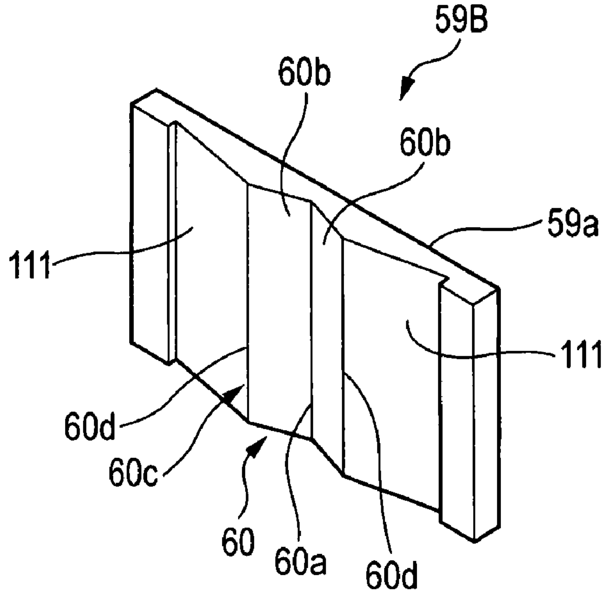
FIG. 11 is a perspective view showing an infrared light transmitting filter according to a third embodiment of the invention.
Figure 12:
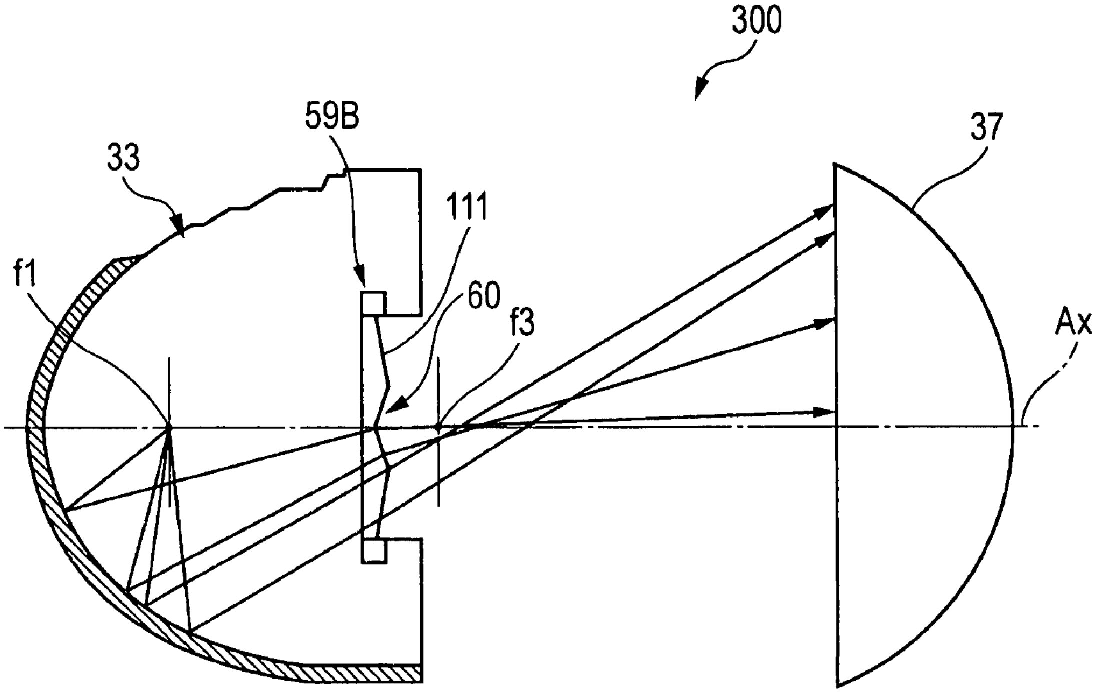
FIG. 12 is an explanatory view showing the function of the infrared light transmitting filter in which a light distribution regulating portion is formed.

FIG. 11 is a perspective view showing an infrared light transmitting filter according to the third embodiment of the invention, and FIG. 12 is an explanatory view showing the function of the infrared light transmitting filter in which a light distribution regulating portion is formed. Since an infrared light irradiating lamp 300 for a vehicle according to the third embodiment has almost the same structure as that of the infrared light irradiating lamp 100 for a vehicle according to the first embodiment except for an infrared light transmitting filter 59B, common members have the same reference numerals and detailed description will be omitted.

In the infrared light irradiating lamp 300 for a vehicle according to the embodiment, the infrared light transmitting filter 59B is provided with a light distribution regulating portion 111 for converging a light transmitted from a reflector 33 separately from a differing portion 60.

The light distribution regulating portion 111 is formed by an inclined surface in such a direction that a filter thickness is gradually reduced apart from both groove opening edges 60*d* and 60*d* of the diffusing portion 60. In other words, a pair of groove opening edges 60*d* and 60*d* are formed to be ridge lines for interposing a V groove 60*c* therebetween.

According to the infrared light irradiating lamp 300 for a vehicle, therefore, in the case in which a request for a diffusion is given to some degree in a high beam, a regulation capable of carrying out a diffusion and emission is previously performed by the reflector 33. In this case, when an infrared light transmitting filter 59 provided with the diffusing portion 60 is used as it is, the diffusion within an unnecessary range is generated. As shown in FIG. 12, however, the light passing through the light distribution regulating portion 111 of the infrared light transmitting filter 59B is converged so that the unnecessary diffusion can be corrected.

The concave or convex shape according to each of the embodiments is formed on each of the front surfaces of the infrared light transmitting filters 59, 59A and 59B (the close surfaces to the convex lens 37). Therefore, it is possible to prevent a reduction in a light transmittance due to the reflection of the infrared light transmitting filters 59, 59A and 59B. More specifically, when the light reflected by the reflector 33 passes through the infrared light transmitting filter, an incident angle of a light is increased, a reflectance is increased at a certain angle and a transmittance is reduced if the diffusing portion taking the concavo-convex shape is formed on the incident plane of the infrared light transmitting filter.

According to the infrared light transmitting filters 59, 59A and 59B in accordance with the embodiment, the diffusing portions 60 and 110 taking the concavo-convex shapes are formed on the emitting surfaces. Therefore, the incident angle of the light can be prevented from being increased and an increase in the reflectance can be suppressed, and the transmittance (a filter efficiency) can be increased.

DESCRIPTION OF THE REFERENCE NUMERALS AND SIGNS

31 . . . light source bulb
31*a* . . . filament
33 . . . reflector
37 . . . convex lens (projection lens)
55 . . . filter driving unit
59 . . . infrared light transmitting filter
60, 110 . . . diffusing portion
100 . . . infrared light irradiating lamp for vehicle
111 . . . light distribution regulating portion
Ax . . . optical axis
f1 . . . first focal point
f2 . . . second focal point
f3 . . . rear side focal point of projection lens

What is claimed is:

1. An infrared light irradiating lamp for a vehicle comprising: a projection lens disposed on an optical axis extending in a longitudinal direction of the vehicle; a light source bulb behind a rear side focal point of the projection lens, the light source bulb comprising a filament for emitting a light; a reflector for reflecting the light emitted from the light source bulb in a forward direction close to the optical axis; and an infrared light transmitting filter disposed between the reflector and projection lens, wherein the infrared light transmitting filter comprises an infrared light transmitting film and a diffusing portion for diffusing a light transmitted from the reflector, wherein the infrared light transmitting filter is movable between a transmitting position in which the infrared light transmitting film intercepts light reflected by the reflector and a retreating position in which the infrared light transmitting film does not intercept the reflected light, and wherein the infrared light transmitting filter is disposed behind a rear side focal point of the projection lens, and a groove bottom portion of the diffusing portion takes a concave shape that intersects the optical axis.

2. The infrared light irradiating lamp for a vehicle according to claim 1, wherein the infrared light transmitting filter comprises a light distribution regulating portion for converging the light transmitted from the reflector separately from the diffusing portion.

3. The infrared light irradiating lamp for a vehicle according to claim 1, wherein the concave shape is a V-groove.

4. The infrared light irradiating lamp for a vehicle according to claim 1, wherein the infrared light transmitting filter is mounted on a bracket.

5. The infrared light irradiating lamp for a vehicle according to claim 1, wherein the infrared light transmitting filter in the transmitting position is substantially orthogonal to the optical axis.

6. The infrared light irradiating lamp for a vehicle according to claim 1, wherein the light source bulb is disposed below the optical axis.

7. The infrared light irradiating lamp for a vehicle according to claim 1, wherein the reflector has a first focal point and a second focal point between the reflector and the projection lens, the second focal point of the reflector is positioned in a vicinity of the rear side focal point of the projection lens, and the filament is positioned on the first focal point, and the light source bulb is apart from the optical axis in a vertical direction.

8. An infrared light irradiating lamp for a vehicle comprising: a projection lens disposed on an optical axis extending in a longitudinal direction of the vehicle; a light source bulb behind a rear side focal point of the projection lens, the light source bulb comprising a filament for emitting a light; a reflector for reflecting the light emitted from the light source bulb in a forward direction close to the optical axis; and an infrared light transmitting filter disposed between the reflector and projection lens, wherein the infrared light transmitting filter comprises an infrared light transmitting film and a diffusing portion for diffusing a light transmitted from the reflector, wherein the infrared light transmitting filter is movable between a transmitting position in which the infrared light transmitting film intercepts light reflected by the reflector and a retreating position in which the infrared light transmitting film does not intercept the reflected light, and wherein the infrared light transmitting filter is disposed in front of a rear side focal point of the projection lens, and a ridge line of the diffusing portion takes a convex shape in the that intersects the optical axis.

9. The infrared light irradiating lamp for a vehicle according to claim 8, wherein the infrared light transmitting filter comprises a light distribution regulating portion for converging the light transmitted from the reflector separately from the diffusing portion.

* * * * *

UNITED STATES PATENT AND TRADEMARK OFFICE

CERTIFICATE OF CORRECTION

PATENT NO. : 7,798,689 B2 
APPLICATION NO. : 11/890701
DATED : September 21, 2010
INVENTOR(S) : Shinji Kagiyama It is certified that error appears in the above-identified patent and that said Letters Patent is hereby corrected as shown below:

In Claim 8, Column 12, line 57, the words "convex shape in the that" should read --convex shape that--.

Signed and Sealed this

Thirtieth Day of November, 2010

David J. Kappos

*Director of the United States Patent and Trademark Office*